June 20, 1967 — E. L. JOHNSON — 3,326,083
PROTECTED ARMING WIRE SYSTEM FOR AN AIRBORNE FREE-FALL WEAPON
Filed Aug. 23, 1965

INVENTOR.
ELMER LEROY JOHNSON
BY Paul A. Welter
ATTORNEY

United States Patent Office 3,326,083
Patented June 20, 1967

3,326,083
PROTECTED ARMING WIRE SYSTEM FOR AN AIRBORNE FREE-FALL WEAPON
Elmer L. Johnson, Brooklyn Center, Minn., assignor to Honeywell Inc., Minneapolis, Minn., a corporation of Delaware
Filed Aug. 23, 1965, Ser. No. 481,835
5 Claims. (Cl. 89—1.5)

ABSTRACT OF THE DISCLOSURE

A protected arming wire system for an airborne free-fall weapon, the arming wire being adapted for connection to the fuze on the weapon and to the aircraft, whereby upon release of the weapon from the aircraft, the wire is pulled free of the fuze, causing the fuze to become armed.

---

This invention relates generally to arming devices for weapons systems and more particularly relates to the design of a protected arming wire system for airborne free-fall weapons.

Airborne free-fall weapons such as bombs have fuzes that must be maintained in a safe condition until the weapon is launched from the aircraft. Although there are many ways of accomplishing this arming function, perhaps the most common method is by means of an arming wire. Basically, one end of the wire is connected to the fuze and the other end of the wire is connected to the aircraft. When the weapon is released from the aircraft, the wire is pulled free from the fuze to permit the fuze to arm. There are many variations on this technique, depending upon the type of weapon, the type of aircraft and many other factors. The present invention is an improved arming wire system.

Although the basic arming wire concept is simple, an operational design becomes more complicated as it is applied to modern weapons systems. The arming wire must be protected from mechanical damage during the time that the weapon is being stored, handled during installation on the aircraft bombrack and during flight. The system must also provide means to assure that the arming wire is not prematurely extracted from the fuze during handling or during the time that it is carried by the aircraft. It is also necessary to provide a simple and convenient means for connecting the arming wire to the widely varying arming wire solenoid positions found on various tactical Navy and Air Force aircraft.

With present day aircraft, it is also necessary to provide means to prevent aerodynamically induced damage to the arming wire. At extremely high aircraft speeds, the externally mounted bomb is subjected to severe aerodynamic stresses. If the arming wire is not suitably protected, these stresses can cause damage to the wire or can result in unintentional arming of the fuze.

In the case of high speed aircraft, it is also very desirable to retain the arming wire with the weapon after release rather than with the aircraft. If the arming wire were left with the aircraft, whipping of the wire in the airstream could cause extensive damage to the aircraft.

Prior art systems have been of two general types, externally routed and internally routed. The externally routed arming wire is normally held in position on the bomb by loops or other guide members. The internally routed wire system, on the other hand, usually provides a conduit through the interior of the weapon to accommodate the arming wire.

The conventional internally routed arming wire systems do provide some mechanical and aerodynamic protection for the arming wire and they do act to prevent premature extraction. They do not, however, retain the wire with the weapon after release and they do not provide a simple and convenient means for connecting the arming wire to different types of aircraft.

Typical externally routed systems provide none of the features above described as being desirable. A variation of the external system known as the Air Force "Supersonic Tie" does retain the wire with the weapon after release and does provide for easy connection to various aircraft, but it does not protect the wire from externally induced damage or from premature extraction.

It is therefore an object of the present invention to provide a protected arming wire system for airborne free-fall weapons that can be factory installed to minimize the time and effort required to make the weapon ready for use; that will provide protection of the arming wire from mechanically or aerodynamically induced damage; that will protect the wire from premature extraction induced by either mechanical or aerodynamic forces; that will retain the wire with the weapon after release to prevent damage to the aircraft; and that will provide simple and convenient means for connecting the arming wire to the various types of aircraft and bombracks presently in use.

Other objects of this invention will be apparent from the specification and claims when considered in connection with the accompanying drawings, in which:

Figure 3:
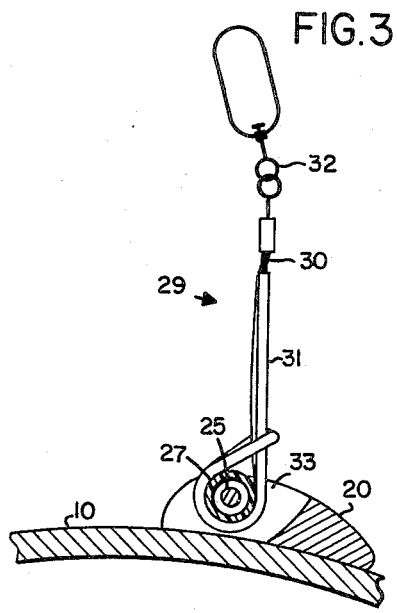
Figure 4A:
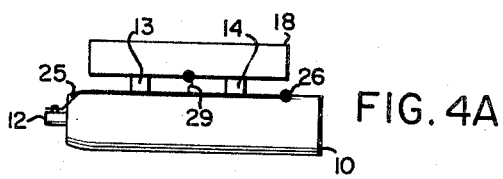
Figure 4B:
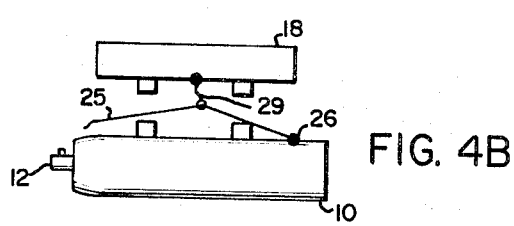
Figure 4C:
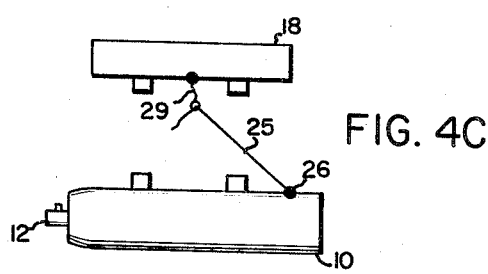

FIGURE 3 discloses a cross-sectional view of the protected arming wire system in combination with an arming wire extractor that connects the arming wire to the aircraft; and FIGURES 4A, 4B, and 4C disclose schematically the sequence of events that occur as the weapon is released from the aircraft.

Figure 1:
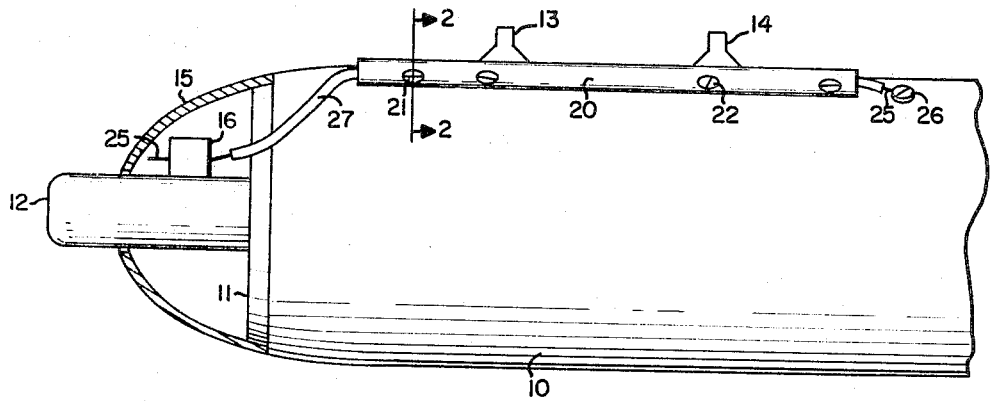
FIGURE 1 is an over-all view of the protected arming wire system as applied to a typical airborne free-fall weapon.

Referring now to FIGURE 1, there is disclosed an over-all view of the present invention as applied to a typical air dropped weapon or bomb. A bomb 10 has a squared-off front portion 11 on which is mounted a fuze 12. The exact method by which fuze 12 functions is not critical to this invention except for the fact that it is armed by the removal of an arming wire as bomb 10 is dropped from the aircraft. Bomb 10 further includes a pair of mounting lugs 13 and 14 that are used to mount the bomb to the aircraft pylon or bomb rack. Bomb 10 further has a metal shield 15 attached to forward portion 11 to protect fuze 12 and provide a better aerodynamic configuration for the bomb.

Mounted along the outside surface of bomb 10 is a protection conduit or housing member 20. Housing member 20 is attached to bomb 10 by means of threaded screws such as 21 and 22. Other means of fastening housing member 20 to bomb 10 could be employed without departing from the invention.

Figure 2:
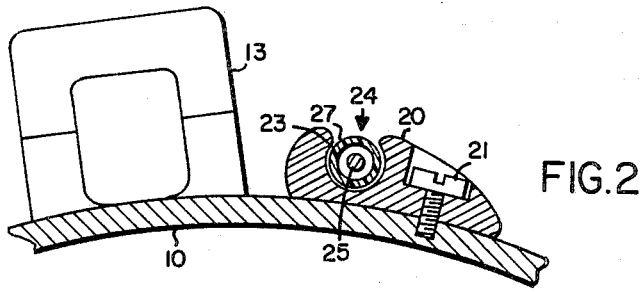
FIGURE 2 is a cross-sectional view of the protected arming wire system taken along lines 2—2 of FIGURE 1.

Referring for a moment to FIGURE 2, there is disclosed a cross-sectional view of housing member 20 taken along line 2—2 of FIGURE 1. From FIGURE 2 it can be seen that housing member 20 has an open groove 23 of generally circular cross-section formed therein extending the full length of housing member 20. Groove 23 has an opening 24 to the outside surface of housing member 20. The width of opening 24 is less than the inside diameter of groove 23.

An arming wire 25 is routed through the full length of groove 23. One end of arming wire 25 is operatively connected to fuze 12 and the other end of arming wire 25 is anchored to bomb 10 by a suitable threaded screw or other anchor means 26. Arming wire 25 actually extends through an extension 16 of fuze 12. When arming wire 25 is pulled free from extension 16, the fuze begins to arm.

Arming wire 25 thus extends from anchor point 26 through groove 23 to its connection with fuze 12. Mounted around wire 25 is a flexible Teflon tube 27. "Teflon" is the Dupont trademark for polytetra fluoroethylene. Teflon tube 27 covers that portion of wire 25 that extends through groove 23. Tube 27 is shown in FIGURE 1 as extending from both ends of housing member 20, however, it is not necessary that tube 27 cover more than that portion of wire 25 that lies within groove 23.

Referring again to FIGURE 2, the relative sizes of cross-sectional dimensions of wire 25, tube 27, groove 23, and opening 24 can be compared. The inside diameter of tube 27 is larger than the outside diameter of wire 25 so that tube 27 is rather loosely fitting with respect to wire 25. It is further apparent from FIGURE 2 that the inside diameter of groove 23 is slightly larger than the outside diameter of tube 27. Tube 27 thus fits snugly within groove 23. It can further be seen that opening 24 is smaller than the outside diameter of tube 27. In an actual embodiment of this invention, wire 25 had a diameter of .064 inch. Tube 27 had an inside diameter .084 inch and an outside diameter of .116 inch. Groove 23 has an inside diameter of .130 inch while opening 24 was .095 inch in width. It is apparent that arming wire 25 and tube 27 cannot be easily removed from groove 23 because of the small size of opening 24. Arming wire 25 is thus protected by housing member 20 from mechanical or aerodynamic damage during handling and during flight. Housing member 20 further protects arming wire 25 from being inadvertently extracted prior to the time the bomb is launched. The relative sizes of tube 27 and opening 24 assures that a predetermined force must be applied to tube 27 and wire 25 to strip them from groove 23.

Referring now to FIGURE 3, there is disclosed a means of removing the arming wire and tube from housing 20 and fuze 12 when bomb 10 is launched from the aircraft. An arming wire extractor 29 includes a steel cable 30 that is covered by a Teflon tube 31. Attached to the ends of cable 30 is a standard arming wire swivel 32 that attaches to the arming wire solenoid on the aircraft. Both ends of cable 30 are connected to swivel 32 so that a Teflon covered cable loop is formed. A notch 33 formed in housing member 20 allows the extractor to be connected to arming wire 25. The extractor loop is inserted in notch 33 and passed between tube 27 and the surface of bomb 10. Swivel 32 is then passed through the end of the loop to tie extractor cable 29 to arming wire 25. This arrangement can clearly be seen in FIGURE 3. Swivel 32 is then connected to the arming wire solenoid on the aircraft. A plurality of notches such as 33 can be formed in housing member 20 so that the arming wire extractor can be inserted at the proper point along arming wire 25 to match the arming wire solenoid position on the particular aircraft being used. Instead of tying the loop as disclosed herein, a simple snap hook could be attached to extractor 29 for quick connection to the arming wire.

Referring now to FIGURES 4A, 4B, and 4C, there is disclosed schematically the sequence of events that occurs as bomb 10 is released from the aircraft. Bomb 10 is connected to an aircraft pylon 18 by means of lugs 13 and 14. Arming wire 25 can be seen as having one end anchored at anchor point 26 and the other end connected to fuze 12. Since this is purely a schematic diagram, the details of the housing arrangement are not disclosed in FIGURE 4A. To summarize the condition of the system in FIGURE 4A, bomb 10 has been connected to pylon 18 and arming wire 25 is connected to the aircraft by means of extractor 29. Arming wire 25 and tube 27 also lie in groove 23 as shown in FIGURES 1, 2 and 3.

In FIGURE 4B, bomb 10 has just been released from pylon 18. As soon as bomb 10 is released, extractor 29 begins to strip wire 25 and tube 27 from groove 23. At the same time, wire 25 is pulled free from fuze 12 so that fuze 12 begins to arm. Since wire 25 is anchored at point 26, it is retained with bomb 10 rather than with the aircraft.

In FIGURE 4C, the final stages of the release are shown. FIGURE 4C clearly discloses that arming wire 25 remains with bomb 10 after launch. Only the short extractor 29 remains with the aircraft.

*Operational summary*

The protective conduit or housing member 20 is mounted externally on the weapon and is slightly offset from the vertical center line to avoid mounting lugs 13 and 14 and various other devices, both on the weapon and on the aircraft, not disclosed in this application. Screws, rivets, structural adhesives, welding or brazing can be used to attach housing member 20 to bomb 10. Notches such as 33 are milled at various stations along housing member 20 that correspond with the associated bomb rack or pylon arming wire solenoid positions. When weapon 10 is mounted to a specific bomb rack, arming wire extractor 29 is disconnected from arming wire 25 by "untying" the loop. Extractor 29 is then moved to the notch 33 that is closest to the appropriate solenoid; retied at this position by slipping the double loop end under wire 25 and tube 27 and then inserting swivel 32 through the loop. Swivel 32 is then inserted into the solenoid on the aircraft to complete the installation.

From this point until release of the weapon the wire is retained in groove 23 by the interference fit condition of tubing 27 with groove exit or opening 24. A predetermined force exerted on the extractor is required to start stripping wire 25 from the groove. This force is sufficient to assure that wire 25 will not be inadvertently removed from groove 23. It is also sufficiently large to assure that extractor 29 will pull out of a deactivated solenoid without initiating fuze 12 should the pilot select a safe jetison mode of weapon release.

When weapon 10 is released from the aircraft in a normal mode, the solenoid retains extractor 29. Extractor 29 strips arming wire 25 and tube 27 out of groove 23. The fixed end of wire 25 is anchored to the surface of the weapon. The other end pulls out of the fuze, initiating its action. Wire 25 and tube 27 continue to slip through the loop in extractor 29 until the free end clears. The wire remains with the weapon and the short extractor remains with the aircraft.

Various modifications may be made within the arming wire system described herein without departing from the invention. Although a Teflon tube was used in the preferred embodiment, it will be obvious to those skilled in the art that other materials having similar features may be substituted. It will therefore be understood that changes may be made within the spirit of the invention limited only by the scope of the appended claims.

I claim as my invention:

1. An arming wire system for airborne free-fall weapons having a fuze that is activated by an arming wire upon launch of the weapon, comprising:

(a) an arming wire having first and second ends, said first end being operatively connected to said fuze, said second end being anchored to said weapon at an anchor point remote from said fuze;

(b) a protective housing member for said arming wire mounted on the exterior surface of said weapon and extending from a point adjacent said fuze to a point adjacent said anchor point, said housing member having an open groove formed therein and extending the length thereof, said wire being routed through said groove;

(c) a Teflon tube covering said wire in said groove, said tube having an inside diameter larger than the diameter of said wire, said groove having an inside diameter larger than the outside diameter of said tube, said groove having an opening in the surface of said housing member that is smaller than the outside diameter of said tube so that a predetermined force is required to strip said arming wire and tube from said groove; and (d) said housing member having at least one transverse notch formed at an intermediate point therein to allow an extractor means to encircle said wire to thereby strip said tube and wire from said groove upon launch of said weapon, said arming wire and tube remaining with said weapon after being stripped from said groove and disconnected from said fuze upon launch of said weapon.

2. An arming wire system for airborne free-fall weapons having a fuze that is activated by an arming wire upon launch of the weapon, comprising:
(a) an arming wire having first and second ends, said first end extending into said fuze, said second end being anchored to said weapon at an anchor point remote from said fuze;
(b) a wire housing member mounted on the exterior surface of said weapon and extending from a point adjacent said fuze to a point adjacent said anchor point, said housing member having an open groove formed therein, said wire being routed through said groove;
(c) a Teflon tube covering said wire in said groove, said tube having an inside diameter larger than the diameter of said wire, said groove having an inside diameter larger than the outside diameter of said tube, the opening of said groove in the surface of said housing member being smaller than the outside diameter of said tube so that a predetermined force is required to strip said arming wire and tube from said groove; and
(d) said housing member having at least one transverse notch formed at an intermediate point therein to allow an extractor means to encircle said wire to thereby strip said tube and wire from said groove upon launch of said weapon.

3. An arming wire system for airborne free-fall weapons having a fuze that is activated by an arming wire upon launch of the weapon, comprising:
(a) an arming wire having first and second ends, said first end being connected to said fuze, said second end being anchored to said weapon;
(b) a protective housing member for said arming wire mounted on said weapon, said housing member having an open groove formed therein, said wire being routed through said groove;
(c) a flexible tube covering said wire in said groove, said tube having an inside diameter larger than the diameter of said wire, said groove having an inside diameter larger than the outside diameter of said tube, the opening of said groove to the surface of said housing member being smaller than the outside diameter of said tube so that a predetermined force is required to strip said arming wire and tube from said groove; and
(d) means for stripping said tube and wire from said groove upon launch of said weapon to activate said fuze.

4. An arming wire system for weapons having a fuze that is activated by an arming wire upon launch of the weapon, comprising:
(a) an arming wire having a first end operatively connected to said fuze and a second end anchored to said weapon at an anchor point remote from said fuze;
(b) a protective housing member for said arming wire mounted on said weapon and having an open groove formed therein extending the length thereof, said wire being routed through said groove; and
(c) a flexible, loosely-fitting tube covering said wire in said groove, the opening to said groove in the surface of said housing member being smaller than said tube so that a predetermined force is required to strip said arming wire and tube from said groove.

5. An arming wire system for weapons having a fuze that is activated by an arming wire upon launch of the weapon, comprising:
(a) an arming wire having first and second ends, said first end being connected to said fuze, said second end being anchored to said weapon;
(b) a protective housing member for said arming wire mounted on said weapon, said housing member having an open groove formed therein, said wire being routed through said groove; and
(c) a flexible tube covering said wire in said groove, said tube having an inside diameter larger than the diameter of said wire, said groove having an inside diameter larger than the outside diameter of said tube, the opening of said groove to the surface of said housing member being smaller than the outside diameter of said tube so that a predetermined force is required to strip said arming wire and tube from said groove.

No references cited.

SAMUEL FEINBERG, *Primary Examiner.*
BENJAMIN A. BORCHELT, *Examiner.*
G. H. GLANZMAN, *Assistant Examiner.*